Patented July 1, 1930

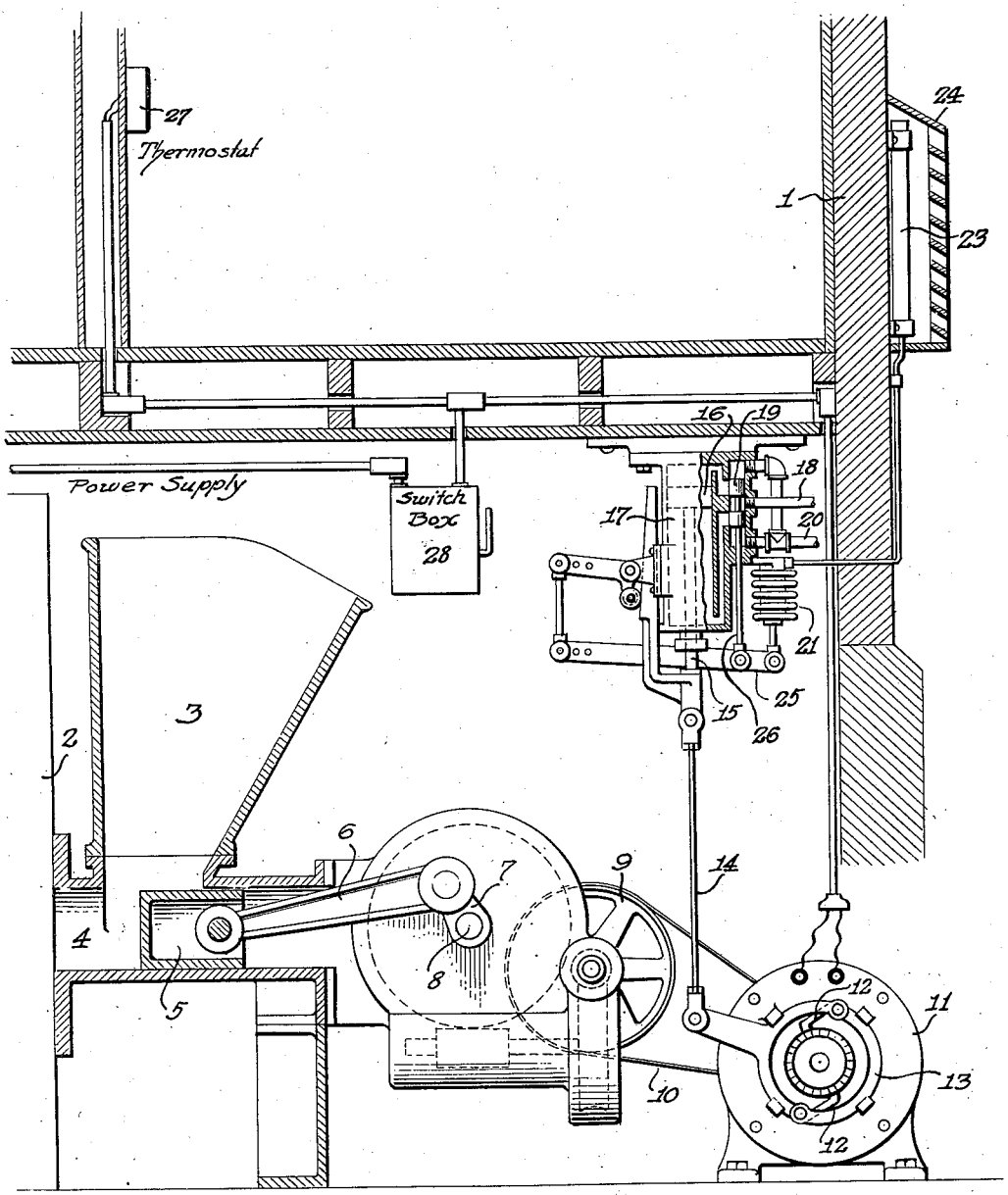

1,769,641

UNITED STATES PATENT OFFICE

WILFRED A. HARE, OF DETROIT, MICHIGAN

CONTROL SYSTEM FOR FURNACE STOKERS

Application filed November 5, 1928. Serial No. 317,328.

This invention relates to a method of a means for controlling the operation of furnaces and more particularly furnaces of the domestic heating type.

In order to have even temperature control in buildings heated during the cold months of the year, thermostatic control is usually resorted to, such control usually comprising a simple three-wire thermostat installed at some suitable point in the building, and means operated by current flow, which is controlled to start or stop the heating apparatus in accordance with the movement of the thermostat in contacting the low or high point respectively at which the thermostat is set.

In the case of liquid or gaseous fuels where ignition of the fire is provided by a constantly burning pilot light or by electric spark, such thermostatic control is sufficient to cause the heating apparatus to function fairly well for the reason that no deterioration takes place in the ignition means during the shut down periods, and therefore the heating apparatus can await indefinitely for the turning on or starting of the fire.

In the case of the use of solid fuels, especially in those instances where the supply of fuel and its necessary draft are supplied automatically by some mechanical apparatus, the condition of the fire during the shut down periods is not constant but tends to burn itself out, thus depriving the fuel supply of the means for igniting it when the apparatus is again started up. This defect is not so noticeable in comparatively cold weather for the reason that the operating periods are sufficiently close together to prevent the fire from dying down below the ignition point, but in mild weather during the spring and fall, considerable trouble is experienced from this cause. Automatic apparatus for feeding solid fuels usually operates at a constant speed when running, and at no speed when shut down. This causes the operating periods to be of short duration and the shut down periods correspondingly long when there is little demand for heat.

An object of the present invention is to provide a method of control that will cause the fuel feeding apparatus to operate at full speed during cold weather when a comparatively large amount of heat is required and will operate at a very much lower speed in mild weather, having a number of intermediate speeds that will be automatically selected, directly proportional to the temperature of the air external of the building in which the heating plant is installed. By this method, the length of shut down periods will be much shortened, thus maintaining sufficient ignition fire for the starting of the burning of added fuel when the feeding apparatus again starts up and preventing the fire from dying out during the shut down periods. In addition to this speed control of the fuel feeding apparatus which operates in accordance with the temperature external of the building, this invention contemplates the use also of a control thermostat located at a desirable point in the building, or other internal control means to control the starting and stopping of the feeding apparatus. By combining the external control with the internal control, when the internal thermostat contacts on the low point, the apparatus starts up, but the external thermostat has, however, caused a speed changing device included in the system, to automatically be set at a low gear ratio, so that when the apparatus is caused by the internal thermostat to start up, the fuel feeding apparatus will be operated at a moderate speed to maintain the fire substantially in proportion to the heat required, and said apparatus will operate for much longer periods than would otherwise be the case where such feeding apparatus is started up at full speed and capacity.

With the above and other ends in view, the invention consists in providing a control system embodying said method of operation, all as hereinafter more fully set forth.

In the accompanying drawing, apparatus designed to operate in the manner set forth, is shown merely as illustrative of the present invention, and wherein the figure of the drawing discloses a fragmentary cross section of a building within which mechanically operated fuel feeding mechanism is shown in a more or less diagrammatic form for supplying a solid fuel to the fire chamber of a heating furnace, together with one form of speed control mechanism for controlling the speed of operation of the fuel feed, said control mechanism being shown partly in elevation and partly in section together with thermostatic means external of the building for controlling the operation of said control mechanism, and also showing thermostatic means within the building for controlling the stopping and starting of the fuel feeding means.

In the drawing the installation of a system embodying the present invention is shown within a building having an outer wall 1 and within the basement of which building is set a furnace of any suitable construction, indicated at 2. This furnace is provided with suitable fuel feeding means for automatically feeding a solid fuel such as coal, into the front end of the furnace, said feeding means as shown, embodying a coal hopper 3 which opens into a tube 4 for delivering the coal into the furnace, said tube containing a piston or plunger 5 operated in any suitable manner as by a connecting rod 6 connected to a crank 7 on a shaft 8, which shaft is driven by a suitable connection with a pulley 9, which in turn is driven by a belt 10 leading from a pulley upon the shaft of an electric motor indicated as a whole by the numeral 11. This motor is preferably a variable speed motor, having brushes 12 carried by a ring 13 so that the position of these brushes may be changed by turning the ring. A rod 14 is connected to an arm on the ring 13 for the purpose of rotating this ring, and the upper end of this rod is pivotally attached to the lower end of a piston rod 15 having a piston 16 working within a cylinder 17 which is supported in any convenient manner. The piston within the cylinder may conveniently be operated hydraulically, that is, the cylinder is connected by a pipe 18 to the city water supply system, which is under pressure and the inlet of water to the piston is controlled by a suitable valve 19 and the water is discharged through an outlet pipe 20.

To control the operation of this hydraulic power means, a bellows 21 is supported adjacent the cylinder 17, and opening into one end of this bellows is a pipe 22 which leads through the wall 1 of the building and up to a thermostat 23 of any suitable construction supported within a suitable protecting casing 24 upon the outside of the wall 1 where it is exposed to the outside temperature.

To the free end of the bellows 21 is connected one end of a lever 25 and pivotally attached to this lever adjacent its connection to the bellows, is a valve rod 26 for operating the valve 19 which controls the inlet and outlet of water to and from the cylinder 17.

When the temperature external of the building falls, the bellows 21 contracts due to the contraction of the fluid within the thermostat 23, pipe 22 and bellows, and due to such connection of the bellows with the valve 19, said valve is shifted to permit water under pressure to enter the cylinder and drive the piston downwardly therein, thus through the connection 14 turning the ring 13 and adjusting the electric motor 11 to run at fast speed. As the temperature external of the building rises from the low point, the thermostat 23 again operates to operate the bellows 21 and adjust the valve 19, permitting the water admitted to the cylinder to drive the piston upwardly therein and thus adjust the motor 11 to run at a slower speed. The speed of the motor will therefore be adjusted between its high and low speeds according to the temperature external of the building.

Located within the building at some convenient point is the usual house thermostat 27 and this thermostat operates in the usual manner to control the electrical circuit for supplying current to the motor 11 so that said motor will be stopped and started by the operation of the thermostat 27. When the temperature within the building falls to the low point at which the thermostat 27 is set, said thermostat will operate to start the motor 11 which drives the fuel feeding mechanism, and when the temperature within the building rises to the point at which the thermostat 27 is set, the motor 11 will be stopped and the feeding of fuel into the furnace will be discontinued until such time as the temperature within the building again falls to the low point.

By this arrangement the stopping and starting of the feeding mechanism is controlled by the temperature within the building and the speed at which the fuel feeding mechanism will operate, is controlled by the temperature external of the building. Therefore, in cold weather, fuel is fed into the furnace at a rate which will adequately take care of the demands for heat and will be discontinued through comparatively short periods of time due to the comparatively rapid fall of temperature within the building caused by the low temperature outside. The periods in which fuel feed is discontinued are therefore comparatively short and therefore the fire within the furnace does not have time to die down to such an extent that it will be insufficient to ignite the new fuel when the fuel feeding mechanism again starts up.

When the temperature outside the building is comparatively warm, as in the spring and fall, the outside thermostat 23 is effective in controlling the speed at which the fuel feeding mechanism will operate, and therefore, when said mechanism is set in operation by the inside thermostat 27, fuel will be fed to the furnace in lesser quantities and at a slower rate, thus bringing up the fire gradually and continuing the feeding operation over a longer period. The fall of temperature within the building due to the outside temperature is correspondingly slow, and therefore while the periods of operation of the feeding mechanism are comparatively far apart due to the warm weather, yet the operations of feeding fuel to the furnace are continued over longer periods of time and therefore during warm weather the fire in the furnace is sufficiently maintained to provide the necessary fire for igniting the new fuel when the feeding apparatus again starts up. In this manner the furnace fire is never permitted to die out completely and sufficient fire is always maintained to ignite the new fuel when the feeding apparatus starts up after a period of inactivity.

Any suitable mechanism may be employed for connecting the valve mechanism of the hydraulic motor with the bellows which is thermostatically operated and the usual devices are connected in the main circuit for supplying current to the motor 11, such as the fuse box and switch 28, co-operating with the thermostat 27 in controlling the current to the electric motor which is provided for driving the fuel feeding mechanism.

It is obvious that other means than an electric motor 11 may be employed for furnishing the power to drive the fuel feeding mechanism and it is also obvious that the speed with which any such power devices will operate may be controlled by any suitable change speed mechanism. The particular character of the fuel feeding mechanism or fuel employed in connection with the control system embodying the present invention is also immaterial and the character of the power means for changing the speed of operation of the fuel feeding means may be varied to suit the character of such feeding means and the change speed mechanism employed in connection therewith. The particular construction and arrangement of these instrumentalities as shown in the accompanying drawing, are merely illustrative of an embodiment of the present invention and changes in their character and arrangement are contemplated to suit the conditions of the particular installation and the character of the fuel and feeding mechanism and its drive. Changes, substitutions and equivalents may therefore be made and employed within the scope of the appended claims without departing from the spirit of the present invention.

Having thus fully described my invention, what I claim is:—

1. The method of controlling the operation of mechanical means for automatically feeding solid fuel to furnaces which consists in controlling the speed of the feeding operation of such mechanical means by temperature responsive means external of the building.

2. The method of controlling the operation of automatic fuel feeding devices for furnaces which consists in controlling the speed of operation of such devices by temperature responsive means external of the building, and controlling the stopping and starting of said devices by temperature responsive means within the building.

3. The method of controlling the operation of automatic fuel feeding devices for furnaces which consists in providing means for controlling the operation of such devices to control the rapidity with which the fuel is fed thereby, providing temperature responsive means outside the building for effecting a change of operating speed in said first named means, and controlling the stopping and starting of the feeding devices by temperature responsive means located within the building.

4. A system for controlling the operation of mechanically operated means for feeding solid fuel to a furnace, which system includes means for controlling the speed of operation of the fuel feeding means, temperature responsive means external of the building for controlling said speed controlling means, and temperature responsive means within the building for stopping and starting the fuel feeding means.

5. A system of control for mechanical stokers which consists in power means for driving the stoker, change speed mechanism for governing the speed at which the stoker will be operated, a temperature responsive device external of the building, and means for controlling said speed change mechanism, said last named means being controlled in its operation by said temperature responsive device external of the building.

6. A system of control for mechanical stokers including a power device for driving said stoker, means for changing the speed at which the stoker will be operated, mechanical means for controlling said speed changing means, a temperature responsive device external of the building for controlling the operation of said mechanical means and a temperature responsive device within the building for stopping and starting the stoker.

In testimony whereof I affix my signature.

WILFRED A. HARE.